United States Patent Office
2,922,754
Patented Jan. 26, 1960

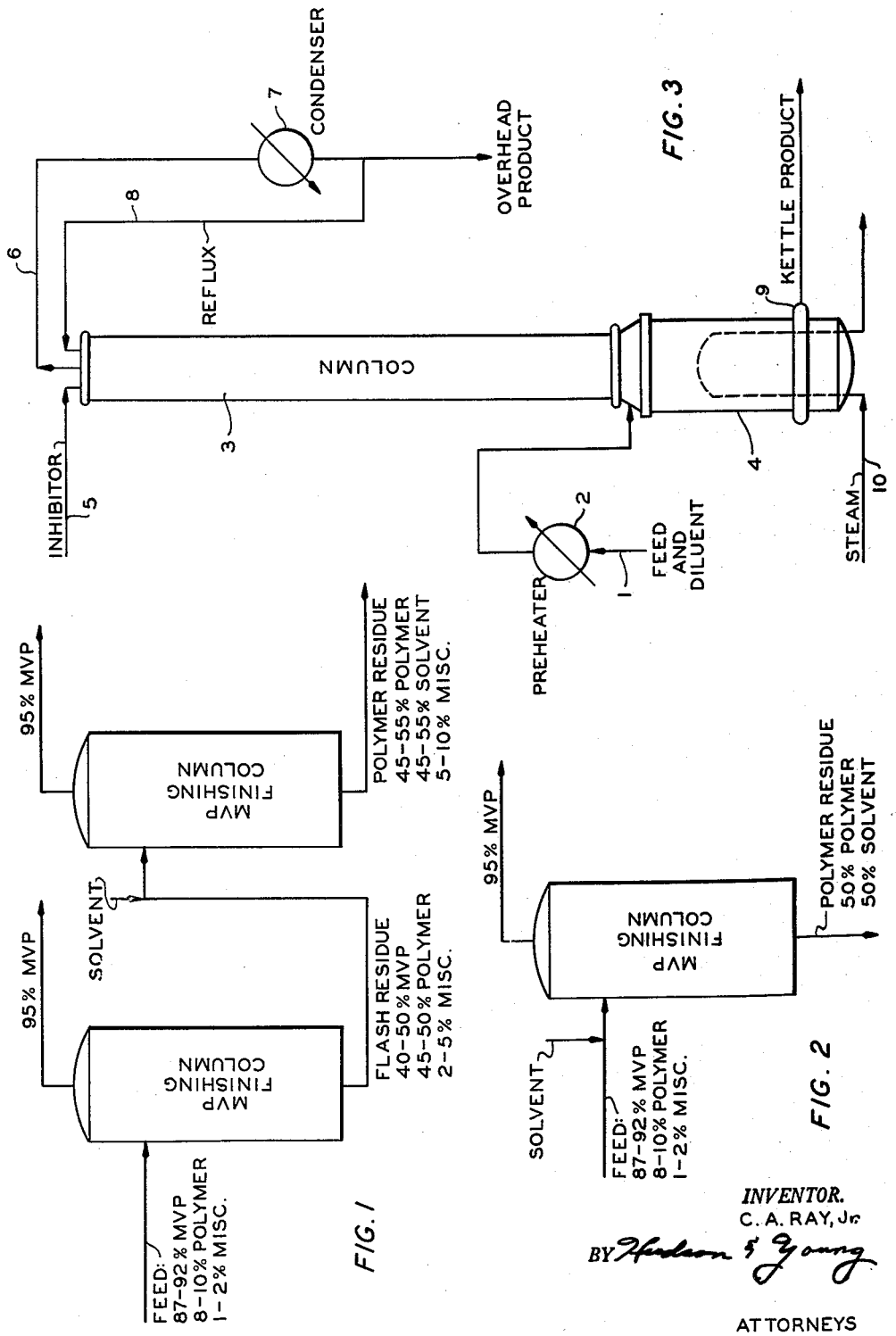

2,922,754
METHYLVINYLPYRIDINE RECOVERY

Charles A. Ray, Jr., Borger, Tex., assignor to Phillips Petroleum Company, a corporation of Delaware Application December 11, 1953, Serial No. 397,735

13 Claims. (Cl. 202—74)

This invention is directed to an improved process for the fractional separation of a mixture of polymerizable organic compounds, one or more of which tend to form viscous polymers. More particularly, it is directed to the fractional separation of 2-methyl-5-vinyl pyridine (MVP) from a mixture consisting essentially of MVP and soluble MVP polymer.

One of the most recent developments in the field of nitrogen-containing petrochemicals is the production of synthetic pyridines on a commercial scale. One of the most important is 2-methyl-5-vinyl pyridine (MVP). This is produced by catalytic dehydrogenation of 2-methyl-5-ethyl pyridine (MEP) according to the following reaction:

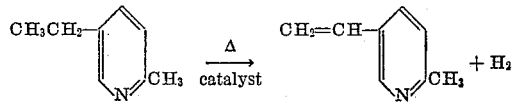

In addition to the main product, MVP, a certain amount of pyridine, as such, 2-picoline, 3-picoline, 3-ethyl pyridine, lutidine (2,5-dimethyl pyridine), and 3-vinyl pyridine by-products are produced.

The vinylpyridines are useful intermediates in the preparation of fibers, adhesives, ion exchange resins, and synthetic rubber.

In conventional operation the product from the dehydrogenation is fractionated in three steps. In the first step unreacted MEP and lighter components are separated overhead from the MVP and heavies in a steam vacuum fractionator with constant reflux. The kettle product, containing about 65-70% by weight MVP, is dewatered and subjected to a secondary vacuum fractionation with the usual heat exchanger and reboiling auxiliaries and a higher vacuum. The kettle product from this step contains about 87-90 weight percent MVP, not over 2-3% MEP, and the remainder soluble MVP polymer. The overhead contains about 30 weight percent MVP; this is recycled to the primary fractionation. The kettle product from the secondary fractionation is used as feedstock for the finishing operation wherein this high purity material is vacuum fractionated to produce 95+ mol percent finished MVP as overhead. Inasmuch as the finishing operation may be considered a flashing, the bottoms product from this operation is termed variously "flash residue" and "kettle product." In both the secondary and finishing operations soluble and insoluble polymers of MVP are formed. By "soluble" and "insoluble" polymers I mean "MVP soluble" and "MVP insoluble." The insoluble polymer remains in the fractionation column, but the soluble polymer forms a large proportion of the kettle product. The bottoms (flash residue) from the finishing operation is a mixture of MVP, heavy pyridines, and soluble MVP polymer and is a viscous mixture whose fluidity is dependent on its MVP content. To keep this residue fluid so it can be poured out of the kettle, it is necessary that it contain approximately 48 weight percent MVP. Obviously, it is economically desirable to recover this MVP.

While the two-step vacuum fractionation I have described is one way of concentrating the MVP, it is to be emphasized that this invention is in no way dependent upon this feature; the MVP fraction of the dehydrogenation product may be concentrated in any other suitable manner without departing from the scope of this invention.

The principal object of the present invention is to effect a more complete fractional separation of a product from a mixture containing the product. A further object is to separate additional liquid product from fractionator bottoms without thereby rendering the bottoms too viscous to pour out. An additional object is to provide a solvent for the undesired residue in a kettle product which will thereby enable the desired component of said kettle product to be distilled therefrom. A more specific object is to provide a solvent for soluble MVP polymer which, when added to a mixture of said polymer with MVP will enable the latter to be flashed off without appreciably increasing the viscosity of the residue at operating temperatures.

In accordance with the present invention a means has been devised for recovering substantially all the MVP in the finishing step described above, or, alternatively, recovering the MVP left in the flash residue therefrom without leaving the residue too viscous to pour out. It has been found that by diluting the kettle product with approximately an equal volume of a good solvent for the polymer, substantially all of the MVP can be flashed therefrom without appreciably affecting the viscosity of the residue. Alternatively, the feed to the finishing operation may be diluted with a sufficient amount of solvent for the polymer to permit recovery of all of the contained MVP in a single operation. In both cases final residue can be removed as a liquid. The boiling point of the additive is such that it will be vaporized only slightly at the MVP flashing temperature.

Among the additives operable for this purpose are glycols such as di- and triethylene glycol and dipropylene glycol, ethers such as tetraethylene glycol dimethyl ether, Carbitol (diethylene glycol monomethyl ether), butyl Carbitol, and esters such as Carbitol acetate. Among the solvents evaluated diethylene glycol has been found to be the best; second best is a 500° F. IBP (initial boiling point) fraction of $SO_2$ extract oil (aromatic gas oil) derived from the refining of a West Texas crude oil. The additive may be added to the kettle in admixture with the feed stream or separately. The $SO_2$ extract oil is preferable to diethylene glycol because the high cost of the latter makes its use economically impractical. Experiments also indicate that the best results are obtained by blending the flash residue with $SO_2$ extract oil in a 1:1 ratio based on the MVP polymer content of the flash residue.

An $SO_2$ extract oil of the type mentioned, obtained from the solvent extraction of a West Texas crude, consists of 50-80% by volume aromatics, 20-40% by volume olefins, and 0-10% by volume paraffins and naphthenes. A typical compostion would be:

Aromatics, volume percent _____ 50
Olefins, volume percent _____ 40
Parafins and naphthenes, volume percent _____ 10
Bromine No. _____ 20–30
Aniline point _____ 20–45
Bureau of Mines correlation index _____ 85–95

Figure 1 is a flow diagram illustrating one embodiment of the invention wherein a typical feed enters the finishing column and MVP is flashed off overhead. The flash residue is mixed with $SO_2$ extract oil and this mixture given a second flash treatment to recover the remainder of the MVP overhead. In a batch-type operation, of course, the two operations may be performed in the same column in series.

Figure 2 is a flow diagram illustrating the other embodiment of the invention wherein the SO₂ extract oil is premixed with the feedstock entering the finishing column.

Figure 3 is a diagrammatic illustration of the embodiment of Figure 2.

EXAMPLE I

A concentrate of 87–90 weight percent MVP was recovered as kettle product from the secondary fractionation of an MVP–MEP mixture. This was vacuum fractionated at a pressure of 10 millimeters of mercury absolute, a reflux ratio (L/D) of 1, and temperatures of 145° F. at the top of the column and 198° F. in the kettle. This operation produced 95+ mol percent MVP as overhead and a residue of approximately 48 weight percent MVP, 45 weight percent soluble MVP polymer, and 7 weight percent heavy pyridines. This residue was mixed in a 2:1 ratio with a 500° F. IBP fraction of SO₂ extract oil (aromatic gas oil) from the refining of a West Texas crude and heated to 120° F. to dissolve the fluid residue in the extract oil. The solution was then flashed in a vacuum fractionator to recover the MVP. Ditertiarybutyl polysulfide was injected continuously into the fractionator at the rate of 0.2 weight percent of the feed to inhibit the formation of insoluble polymer. A total of 605 pounds of approximately 92 mol percent of MVP was recovered from 1671 pounds of flash residue.

EXAMPLE II

In the finishing operation for the recovery of 95+ mol percent MVP from 87–90 weight percent MVP (95–98% MVP on a polymer-free basis) dry 500° F. IBP SO₂ extract oil from the refining of a West Texas crude was added directly to the feed at a ratio of 1:1 based on MVP polymer content of the feed. Data for this run was as follows:

Table I

| | |
|---|---|
| Total feed, pounds | 891 |
| Feed composition, pounds: | |
|    Polymer | 55 |
|    SO₂ extract oil | 55 |
|    MVP | 757 |
|    Other pyridines | 24 |
| Overhead product: | |
|    Total pounds | 726 |
|    MVP pounds | 709 |
| Kettle product: | |
|    Total pounds | 151 |
|    Polymer pounds | |
| Polymer formed, pounds | |
| Percent increase in polymer | |
| Polymer to SO₂ extract oil, weight ratio | 1.0:1 |
| Percent of MVP recovered | 94 |
| Total loss, pounds [1] | 14 |

[1] Loss calculated as MVP.

Table I shows that 94 weight percent of the MVP in the feed was recovered as specification MVP. Also, the kettle product, a 50/50 mixture of the polymer and SO₂ extract oil, was fluid and easily handled at temperatures above 150° F. The addition of SO₂ extract oil to the feed for the finishing operation eliminated the need for recovering MVP from the flash residue and saved the MVP which would normally have been lost through polymerization during the processing of the flash residue.

EXAMPLE III

Three runs were made for the recovery of MVP from flash residue or kettle product from the finishing operation. Referring to Figure 3, the flash residue was mixed with SO₂ extract oil from the refining of a West Texas crude in ratios varying from about 2:1 to about 1:1. Each mixture was fed at the rate of 10 pounds per hour through line 1 and preheater 2 into the bottom of column 3, the inlet temperature being 179° F. Column 3 is 28½' high and 6" in diameter and was packed with berl saddles to a height of 26'. Polymerization inhibitor was added at the rate of 0.2 pound per hour to the top of the column through 5. The reboiler 4 at the base of the column was steam heated via line 10 to maintain the kettle product at a temperature of about 226° F. The pressure in the reboiler was 15 millimeters of mercury absolute and at the top of the column 10 millimeters of mercury absolute. The temperature at the midpoint of the column was 150° F. and at the top 145° F. Overhead was withdrawn through line 6 and condenser 7 at the rate of 3 pounds per hour. One pound per hour of overhead condensate was returned through 8 as reflux to the top of column 3. Kettle product was withdrawn at 9 at the rate of 7 pounds per hour. Material balances are given in Table II below:

Table II

| | Run 1 | Run 2 | Run 3 | Total |
|---|---|---|---|---|
| Total Feed, pounds | 1,305 | 414 | 540 | 2,259 |
| Feed Composition, pounds: | | | | |
|    Polymer | 419 | 165 | 180 | 764 |
|    SO₂ Extract Oil | 385 | 83 | 120 | 588 |
|    MVP | 440 | 146 | 209 | 795 |
|    Other Pyridines | 61 | 20 | 31 | 112 |
| Overhead Product: | | | | |
|    Total Pounds | 353 | 93 | 159 | 605 |
|    MVP Pounds | 326 | 87 | 145 | 558 |
| Kettle Product: | | | | |
|    Total Pounds | 944 | 299 | 363 | 1,606 |
|    Polymer Pounds | 525 | 202 | 226 | 953 |
| Polymer Formed, pounds | 106 | 37 | 46 | 189 |
| Percent Increase in Polymer | 25 | 22 | 26 | 25 |
| Polymer to SO₂ Extract Oil, weight ratio | 1.1:1 | 2.0:1 | 1.4:1 | [1] 1.3:1 |
| Percent of MVP Recovered | 74 | 60 | 70 | [1] 70 |
| Total Loss, pounds [2] | 8 | 22 | 18 | 48 |

[1] Weighted average.
[2] Loss calculated as MVP.

The above data indicate that the recovery of MVP increases as the weight ratio of polymer to SO₂ extract oil approaches 1:1 and that, at that ratio, substantially all the contained MVP is recovered.

The foregoing discussion and examples lead to the following conclusions:

(1) The recovery of MVP from the flash residue is facilitated by the blending of a high boiling aromatic oil therewith.

(2) A 500° F. IBP fraction of SO₂ extract oil from the refining of a West Texas crude was a suitable solvent and carrier for the polymer during the recovery of MVP from the flash residue.

(3) The addition of SO₂ extract oil to the feed for the finishing operation permits recovery of almost 94 weight percent of the MVP contained in the feed and eliminates the need for further processing of the flash residue.

(4) The recovery of MVP increases as the weight ratio of polymer to SO₂ extract oil approaches 1:1.

While the above discussion has been directed to the recovery of MVP, it is equally applicable to the recovery of 2-vinyl-5-ethyl pyridine (VEP). The latter is the equivalent of MVP for certain purposes and is prepared by reacting MEP with formaldehyde according to the following reaction:

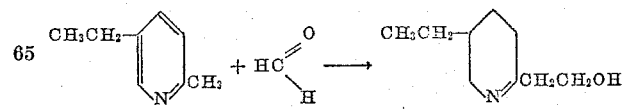

This is then dehydrated to 2-vinyl-5-ethyl pyridine as follows:

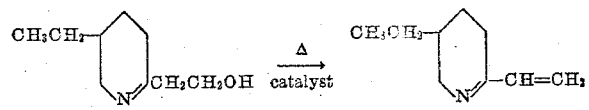

The product from the dehydration poses an MEP–VEP separation problem similar to that of MEP-MVP separation. Hence, the improved recovery process described above would be as applicable to one as to the other.

It is believed apparent that the invention is not limited to the foregoing examples, these being but illustrative, and that various modifications can be made in the way of temperature, solvents, equipment, etc., without departing from the spirit of the invention.

I claim:

1. In a process wherein a mixture containing essentially methylvinylpyridine and methylethylpyridine is subjected to a primary and secondary fractionation to distill off the methylethylpyridine, the bottoms product from the secondary fractionation passed to a finishing operation wherein it is vacuum fractionated to produce approximately 95+ mol percent methylvinylpyridine as overhead, leaving as kettle product a viscous mixture comprising methylvinylpyridine and soluble methylvinylpyridine polymer, the fluidity of which depends on the methylvinylpyridine content, approximately 48 weight percent of methylvinylpyridine being necessary to maintain a fluid kettle product at 180-200° F., the improvement comprising diluting the bottoms product from the secondary fractionation with a solvent for the soluble polymer content, said solvent vaporizing only slightly at the flashing temperature of methylvinylpyridine, whereby substantially all the methylvinylpyridine in said bottoms product can be flashed off without leaving the kettle product too viscous to pour.

2. The process of claim 1 comprising, as the final step, flashing off the methylvinylpyridine and recovering a fluid residue.

3. The process of claim 1 wherein the solvent is diethylene glycol.

4. The process of claim 1 wherein the solvent is an aromatic gas oil.

5. The process of claim 1 wherein the solvent is a 500° F. IBP fraction of $SO_2$ extract oil.

6. The process of claim 1 wherein the solvent is added in the ratio of 1 volume of solvent to 1 volume of soluble polymer.

7. In a process wherein a mixture containing essentially methylvinylpyridine and methylethylpyridine is subjected successively to a primary and secondary fractionation to separate the methylethylpyridine as overhead, the bottoms product from the secondary fractionation vacuum flashed to recover the finished methylvinylpyridine as overhead, leaving as flash residue a viscous mixture of methylvinylpyridine, soluble methylvinylpyridine polymer, and heavy pyridines, and wherein the fluidity of said flash residue depends on its methylvinylpyridine content, requiring about 48 weight percent methylvinylpyridine to remain fluid at 180-200° F., the improvement comprising recovering the methylvinylpyridine from said flash residue without adversely affecting the latter's viscosity by diluting the flash residue with a solvent for the polymer, said solvent vaporizing only slightly at the flashing temperature of methylvinylpyridine, and flashing off substantially all the methylvinylpyridine therefrom.

8. The process of claim 7 wherein the solvent is added in the ratio of about 1 volume of solvent to 1 volume of polymer.

9. A process for recovering methylvinylpyridine from a solution comprising essentially 40 to 50 weight percent methylvinylpyridine and 45 to 50 weight percent polymer which comprises admixing with said solution an amount of a solvent for said polymer in the range of 1 to 2 times the weight of polymer and of substantially higher boiling point than methylvinylpyridine, distilling substantially all of the methylvinylpyridine from the resulting solution whereby the remaining solution of polymer and solvent is readily flowable at temperatures above 150° F. and recovering the distilled methylvinylpyridine.

10. The process of claim 9 wherein the solvent is diethylene glycol.

11. The process of claim 9 wherein the solvent is an aromatic gas oil.

12. The process of claim 9 wherein the solvent is a 500° F. IBP fraction of $SO_2$ extract oil.

13. A process for the separation of methylvinylpyridine from a solution comprising principally methylvinylpyridine and methylvinylpyridine polymer in which the polymer is in the range of about 8 to 10 weight percent of the solution which comprises distilling methylvinylpyridine from said solution until the concentration thereof is in the range of 40 to 50 weight percent, admixing with the residue an amount of solvent for said polymer at least equal to the weight of the polymer and having a higher boiling point than said methylvinylpyridine, thereafter distilling substantially all of the remaining methylvinylpyridine and the resulting solution so as to leave a solution of polymer readily flowable at temperatures above 150° F. and recovering methylvinylpyridine from both distillation steps.

References Cited in the file of this patent

UNITED STATES PATENTS

| | | |
|---|---|---|
| 1,547,893 | Berguis | July 28, 1925 |
| 2,151,990 | Ruys | Mar. 28, 1939 |
| 2,152,164 | Wentworth | Mar. 28, 1939 |
| 2,315,422 | Hildebrant | Mar. 30, 1943 |
| 2,395,901 | Murphree | Mar. 5, 1946 |
| 2,399,672 | Green | May 7, 1946 |
| 2,406,648 | Weisberg et al. | Aug. 27, 1946 |
| 2,611,769 | Hays | Sept. 23, 1952 |
| 2,623,844 | Scheeline | Dec. 30, 1952 |
| 2,677,688 | Burrows et al. | May 4, 1954 |